(12) United States Patent
Suso et al.

(10) Patent No.: US 6,396,924 B1
(45) Date of Patent: *May 28, 2002

(54) INFORMATION COMMUNICATION TERMINAL DEVICE

(75) Inventors: Koji Suso, Kokubunji; Atsuhiko Urushihara, Higashiyamato, both of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/503,111

(22) Filed: Feb. 14, 2000

Related U.S. Application Data

(63) Continuation of application No. 09/134,579, filed on Aug. 14, 1998, now Pat. No. 6,069,648.

(30) Foreign Application Priority Data

Aug. 22, 1997 (JP) ............................................. 9-226800

(51) Int. Cl.[7] .................................................. H04M 1/00
(52) U.S. Cl. .................................................. 379/433.13
(58) Field of Search ............................ 379/433.13, 428, 379/93, 23; 348/14, 15, 552; 485/575, 90

(56) References Cited

U.S. PATENT DOCUMENTS

| 5,414,444 A | 5/1995 | Britz |
| 5,491,507 A | 2/1996 | Umezawa et al. |
| 5,719,799 A * | 2/1998 | Isashi ........................... 348/552 |
| 6,069,648 A * | 5/2000 | Suso et al. ................. 379/93.23 |

FOREIGN PATENT DOCUMENTS

| JP | 3-123152 | 5/1991 |
| JP | 6-292195 | 10/1994 |
| JP | 6-292197 | 10/1994 |
| JP | 7-212253 | 8/1995 |

* cited by examiner

Primary Examiner—Jack Chiang
(74) Attorney, Agent, or Firm—Antonelli, Terry, Stout & Kraus, LLP

(57) ABSTRACT

An information communication terminal device having a first display/operation part and a second display/operation part mounted on an upper and a lower case, respectively. A housing member accommodates a video camera therein, and a support mechanism rotatably supports the first display/operation part, the second display/operation part and the housing member on the same rotation axis with respect to each other. The first and second display/operation parts are rotatably mounted by at least 180 degrees about the housing member and are structured so as to be opposed to each other when the information communication terminal device is in an opened condition and to be overlapped with respect to each other when the information communication terminal device is in a closed condition.

10 Claims, 9 Drawing Sheets

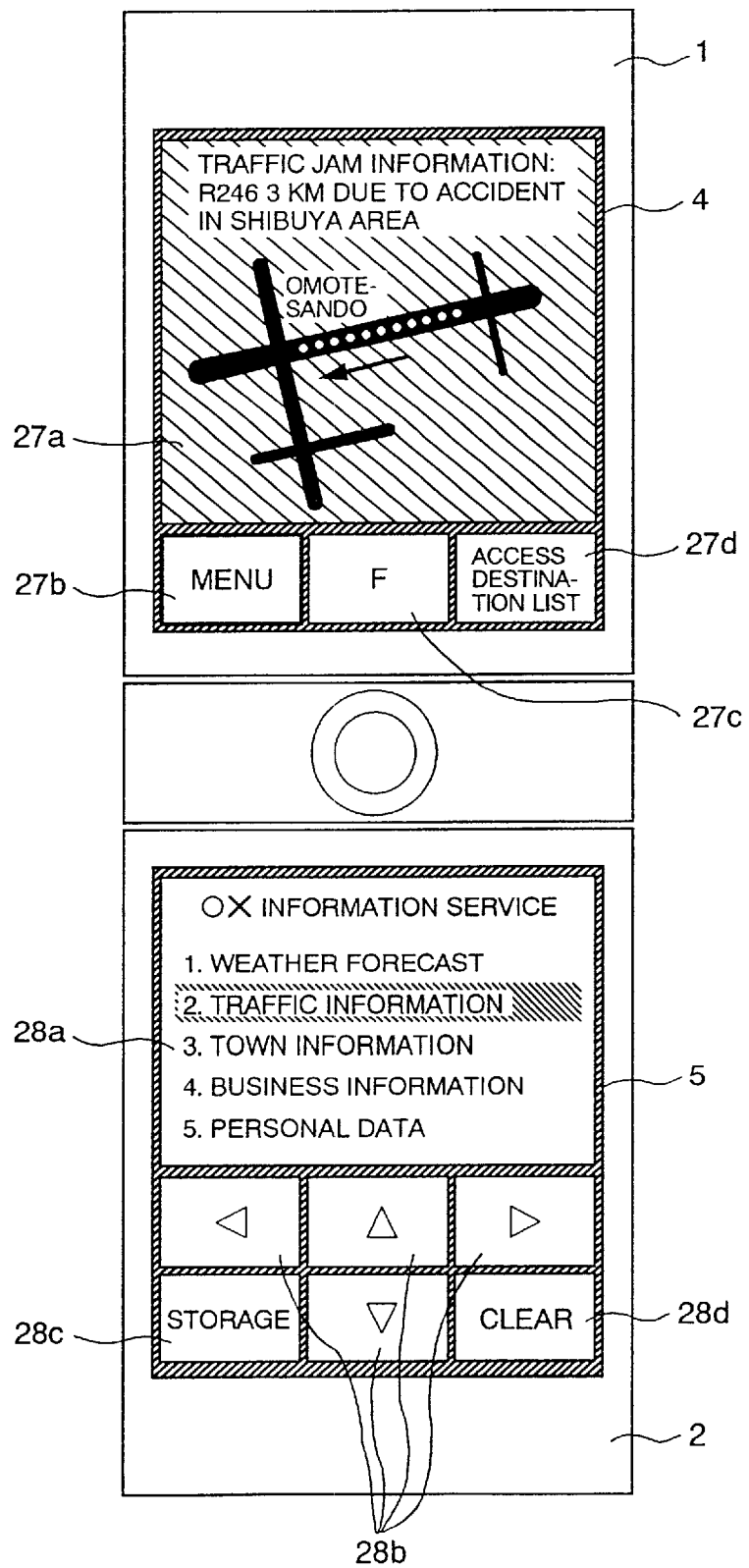

INFORMATION COMMUNICATION TERMINAL DEVICE

CROSS REFERENCE TO RELATED APPLICATION

This is a continuation of U.S. application Ser. No. 09/134,579, filed Aug. 14, 1998, now U.S. Pat. No. 6,069,648, the subject matter of which is incorporated by reference herein.

BACKGROUND OF THE INVENTION

The present invention relates to an information communication terminal device having a video camera and, more particularly, to an information communication terminal device which is convenient to carry and has a plurality of functions.

A portable telephone which can perform transmission and reception in a carrying destination is rapidly being spread as a portable information communication terminal device for personal use. The portable telephone is obtained by reducing the size of a telephone so as to be conveniently carried and by which a voice can be sent and received wirelessly between the user and the other side. The portable telephone, however, does not have the function of transmitting and receiving image data like a television telephone system.

As another portable information communication terminal device, a portable terminal (FDA) is known. Some portable terminals have the image data transmission/reception function and can transmit and receive image data. A portable terminal which is used on condition that it is connected to a portable telephone is the main stream at present. By carrying the portable terminal with the portable telephone, transmission and reception can be naturally performed.

The above-mentioned conventional portable terminal, however, has a main purpose to collect, process, transmit and receive data at a place the user has gone, so that it does not have a video camera unlike a television telephone system and does not transmit and receive an image generated from the video camera. Although the function of image transmission and reception and a telephone can be provided in connection with a portable telephone, the face of the other side of conversation cannot be confirmed.

A portable communication terminal under the present conditions is bulky as compared with a portable telephone and the size is not pocketable unlike a portable telephone, so it is inconvenient to carry.

Further, in case of employing the construction in which a portable terminal and a portable telephone are connected and used, since the portable terminal and the portable telephone have to be carried, it is more inconvenient to carry them.

SUMMARY OF THE INVENTION

It is an object of the invention to provide an information communication terminal device which solves the problems, has excellent portability, can also deal a moving image, and realizes multifunction.

In order to achieve the object, the invention employs a construction in which a first display/operation part and a second display/operation part are rotatably attached to the same rotary shaft and a video camera is installed in the rotary shaft.

According to the invention, there is also provided a mode selection button which can select a recording mode, a transmission/reception mode, and an information acquisition mode. When the recording mode is selected, a video image obtained by the video camera is displayed in the first display/operation part and an image stored in an image storing means is displayed in the second display/operation part. When the transmission/reception mode is selected, if the other side of transmission is a telephone of only voices, character information such as name, telephone number, and the like of the other side is displayed in the first display/operation part and operating means such as dials having the function of the touch panel is displayed in the second display/operation part. When the other side of transmission is a television telephone, an image obtained by the video camera and an image of the other side are displayed in the first display/operation part and the second display/operation part is used as an input section of character and figure data. When the information acquisition mode is selected, the menu of the information service is displayed in the second display/operation part and the information contents of the service selected from the menu are displayed in the first display/operation unit.

BRIEF DESCRIPTION OF THE DRAWINGS

FIG. 9 is a diagram showing the display contents in the display/operation parts in an information acquisition mode as further another one of the use modes in the embodiment shown in FIG. 1.

DETAILED DESCRIPTION OF THE PREFERRED EMBODIMENTS OF THE INVENTION

An embodiment of the invention will be described hereinbelow with reference to the drawings.

Figure 1C:
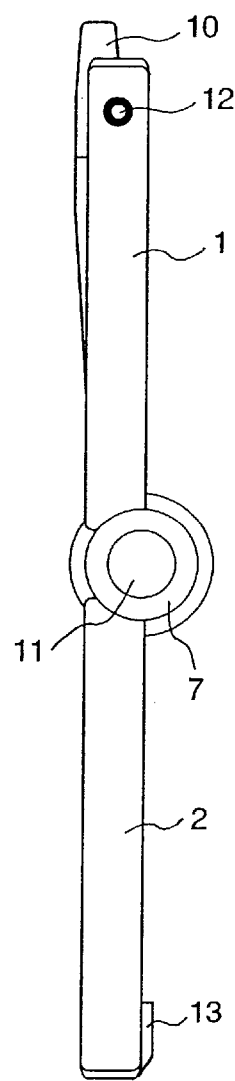
FIGS. 1a to 1c are a diagram showing the construction of an embodiment of an information communication terminal device according to the invention.
Figure 1A:
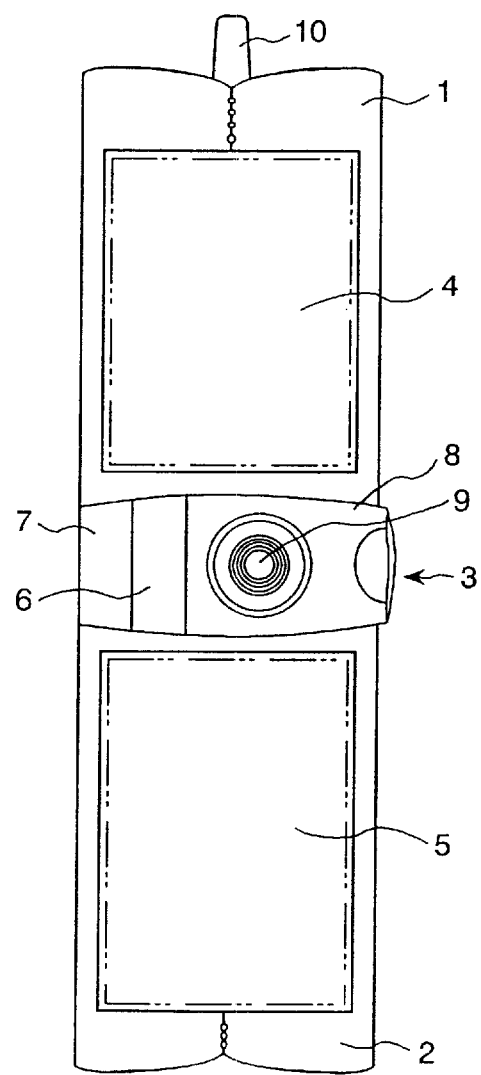
Figure 1B:
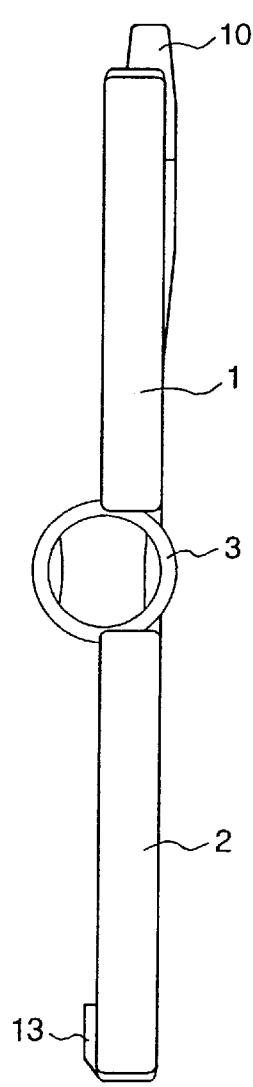

FIGS. 1a to 1c are a construction diagram showing an embodiment of an information communication terminal device according to the invention. FIG. 1a of the diagram is a front view, FIG. 1b of the diagram is a right side view, and FIG. 1c of the diagram is a left side view. The device includes an upper case 1, a lower case 2, a connection part 2, display/operation parts 4 and 5, a rotary shaft supporting part 6, a rotary shaft 7, a housing member 8, a camera lens 9, an antenna 10, a power source button 11, an earphone jack 12, and a microphone 13.

The two display/operation parts 4 and 5, and the housing member 8 mounting a video camera in the housing member itself are rotatably supported on the same rotation axis by a rotation mechanism with respect to each other. The display/operation parts 4 and 5 are rotatably mounted so as to rotate around the housing member 8 and are opposed to each other when opened and piled upon each other when closed.

In the diagram, a hinge is constructed by the rotary shaft 7 provided for the upper case 1 and the rotary shaft supporting part 6 provided for the lower case 2, so that the upper case 1 and the lower case 2 can be opened and closed like a notebook. The housing member 8 is rotatably attached to the rotary shaft supporting part 6 from the opposite side of the rotary shaft 7. In the housing member 8, a thin video camera, a circuit board on which a circuit for processing an output of the video camera is mounted, and the like are housed. A hole is opened in a part of the housing member 8 and the camera lens 9 is attached to the hole part. Consequently, there are no parts projecting from the housing member 8 to the outside.

The display/operation part 4 is provided for the upper case 1 and the display/operation part 5 is provided for the lower case 2. Each of the display/operation parts 4 and 5 has the construction such that a touch panel is overlapped on a liquid crystal display plane. In the display/operation parts 4 and 5, an image obtained by the video camera and an image showing operation buttons are displayed.

On the back face of the upper case 1, the antenna 10 for transmission and reception is provided so as to be projected from the upper side of the case when the antenna 10 is extended and the earphone jack 12 is provided in the upper part of the left side face of the upper case 1. Further, the power source button 11 is provided at the top of the rotary shaft 7 and the microphone 13 is provided on the lower side part of the lower case 2.

Figure 2:
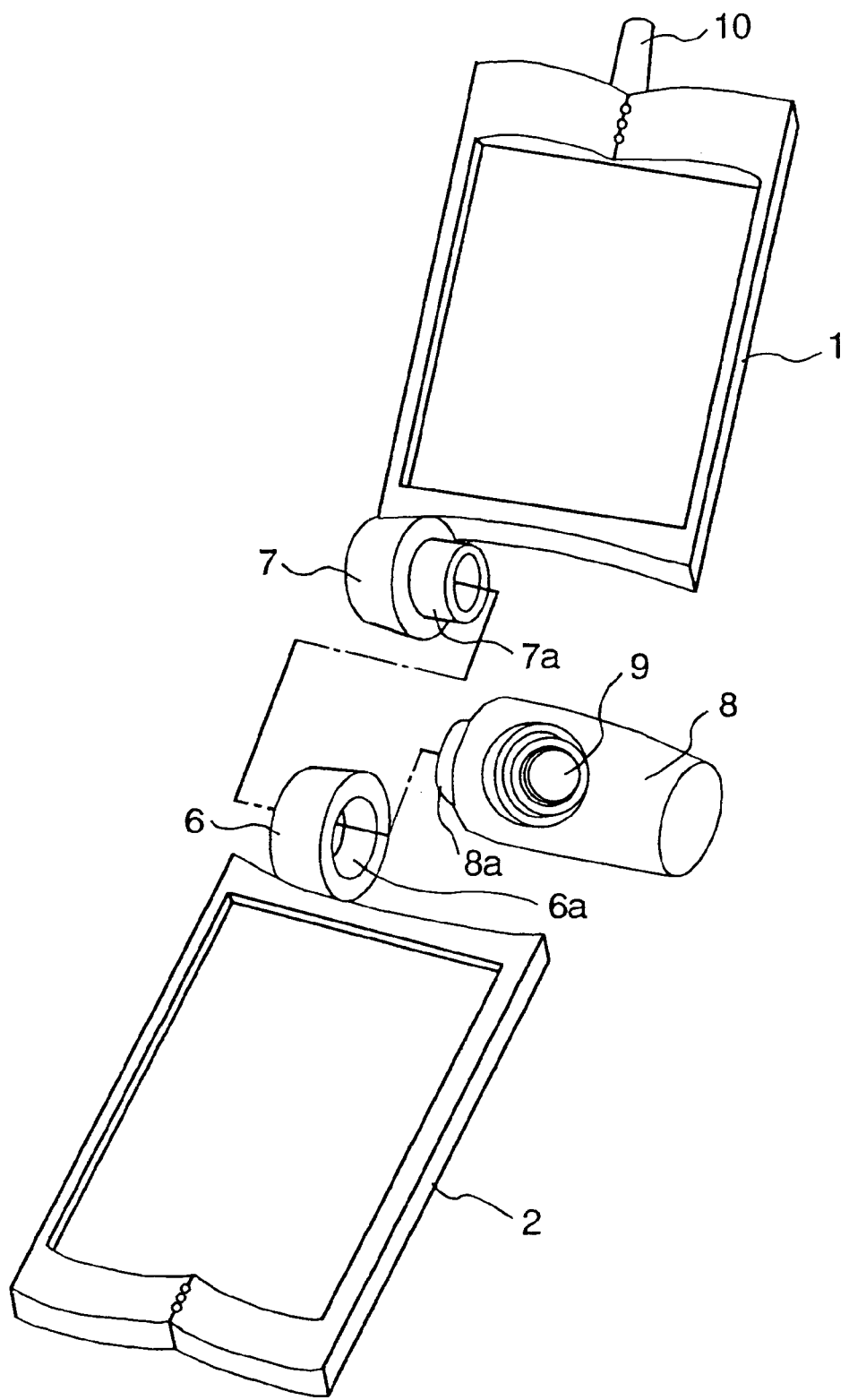
FIG. 2 is an exploded view of the embodiment shown in FIG. 1.

FIG. 2 is an exploded view of the embodiment and a small diameter part 7a of the rotary shaft 7 and a small diameter part 8a of the housing member 8 are inserted into a through hole 6a opened in the rotary shaft supporting part 6 of the lower case 12 from the opposite sides. The device is assembled in such a manner that one of the small diameter parts 7a and 8b is rotatably fit into the other in the through hole 6a. Consequently, the cases 1 and 2 can be closed and opened and the housing member 8 can be rotated with respect to the rotary shaft supporting part 6. In a state where the cases 1 and 2 are open, by rotating the housing member 8 with a knob 8b, the direction of the camera lens 9, that is, the photographing direction of the video camera housed in the housing member 8 can be therefore changed around the rotary shaft 7 as a center. The rotary shaft 7 having a small diameter part 7a, the rotary shaft supporting part 6 having a through hole 6a and the housing member 8 having a small diameter part 8a act as a rotating support mechanism.

Figure 3B:
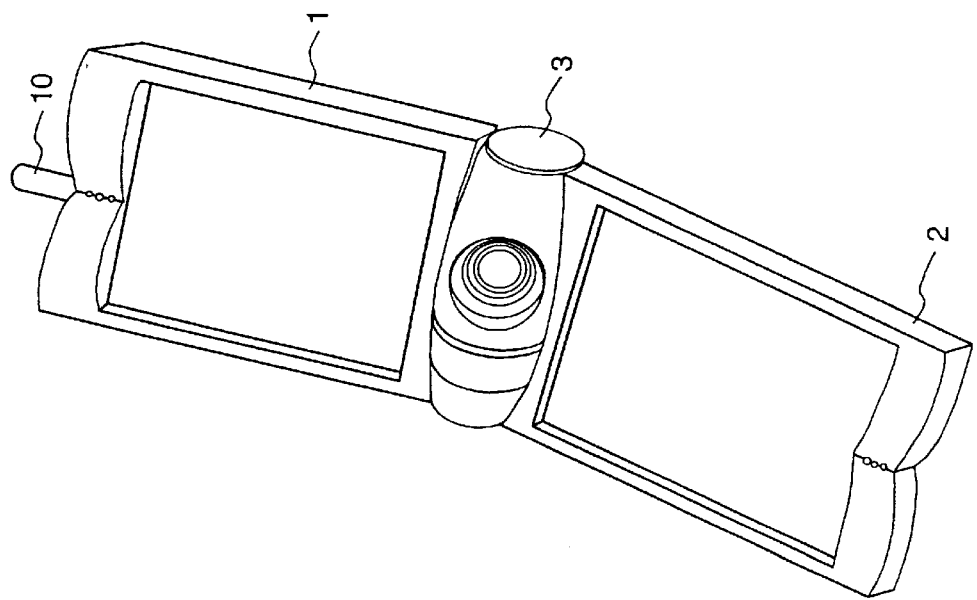
FIGS. 3a and 3b are a perspective view showing a closed state and an opened state of the embodiment shown in FIG. 1.
Figure 3A:
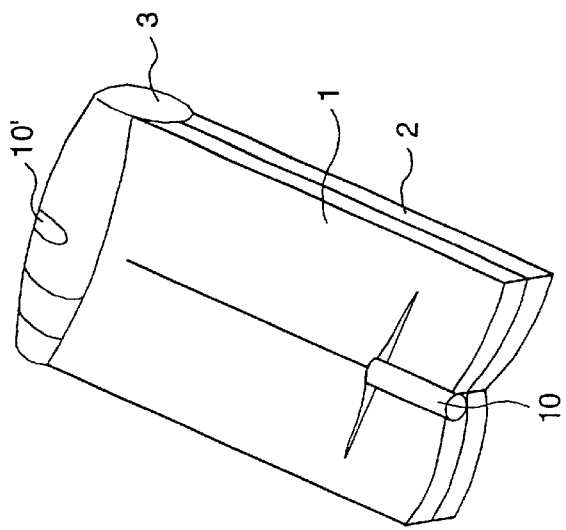

FIG. 3a shows a state where the cases 1 and 2 of the embodiment are closed. In this state, except that the antenna 10 is projected to the outside on the back face of the upper case 1, no member is projected to the outside from the back face of the lower case 2 and from the surface of the connection part 3 constructed by the housing member 8 and the like. In this case, the antenna 10 is extendable. When the cases 1 and 2 are closed, the antenna 10 can be shortened. In this state, the end of the antenna 10 is recessed from the side of the upper case 1. FIG. 3b shows a state where the cases 1 and 2 of the embodiment are open. The state is a using state of the embodiment. In this case, the antenna 10 is in an extended state.

As shown in FIG. 3a, an infrared communication means 10' for IRDA (wireless communication using infrared) is provided for the connection part so as not to be exposed to the outside, so that information recorded in a memory built in the body can be easily transmitted by using IRDA to an information system such as a personal computer having a similar communication means.

According to the embodiment as mentioned above, the circuit board for processing the video camera and its output, and the like are housed in the housing member 8 and there is no member protruding from the cases 1 and 2 and the connection part 3 except that the antenna 10 is provided on the back face of the upper case 1. Consequently, there is not especially a member which appears on the surfaces of the cases 1 and 2 when the cases 1 and 2 are opened. The display/operation part 4 can be therefore formed on an almost whole surface of the upper case 1 and the display/operation part 5 can be similarly formed on an almost whole surface of the lower case 2.

Figure 4:
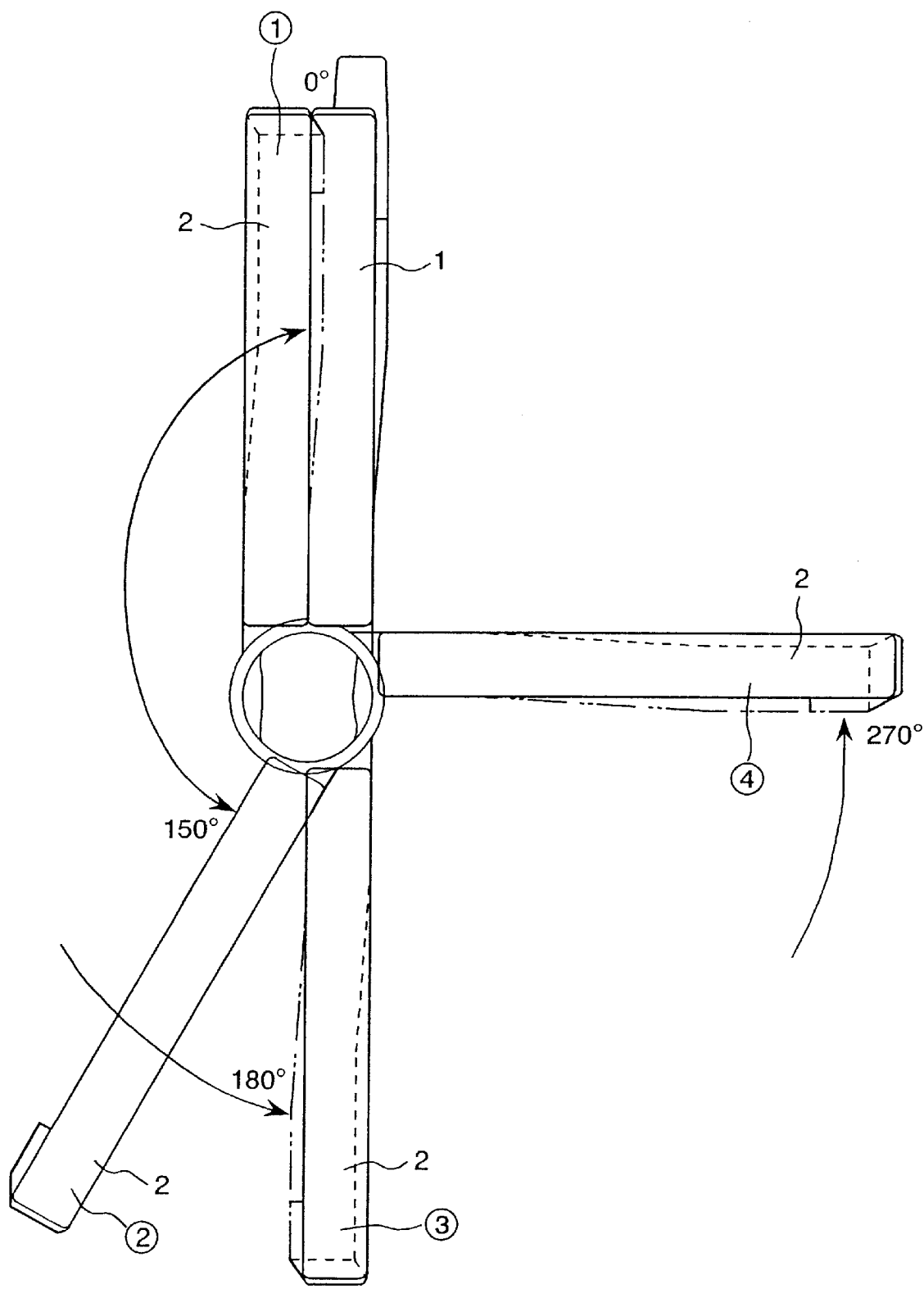
FIG. 4 is a side view showing a specific example of open states of cases of the embodiment shown in FIG. 1.

FIG. 4 is a diagram showing a specific example of opening angles of the cases 1 and 2 according to use modes in the embodiment.

In the diagram, the opening angles of the cases 1 and 2 when the lower case 2 is rotated from the upper case 1 as a reference are shown. The state of (1) shows a state where the opening angle =0° and the cases 1 and 2 are closed. It is assumed that the cases are stably locked in the four kinds of open states including the closed state. The other three kinds are a state of (2) where the opening angle=150°, a state of (3) where the opening angle=180°, and a state of (4) where the opening angle=270°.

FIGS. 5a to 5d is a diagram showing a specific example of the relations between the opening angles of the cases 1 and 2 shown in FIG. 4 and use modes of the embodiment.

Figure 5A:
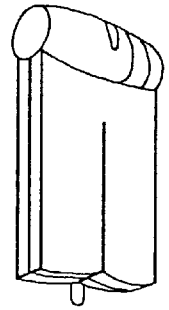
FIGS. 5a to 5d are a perspective view showing a specific example of the relations between case opening states shown in FIG. 4 and use modes.

FIG. 5a shows a state where the cases 1 and 2 are closed. This case relates to the state of (1) in FIG. 4 and is a state where the embodiment is not used.

Figure 5B:
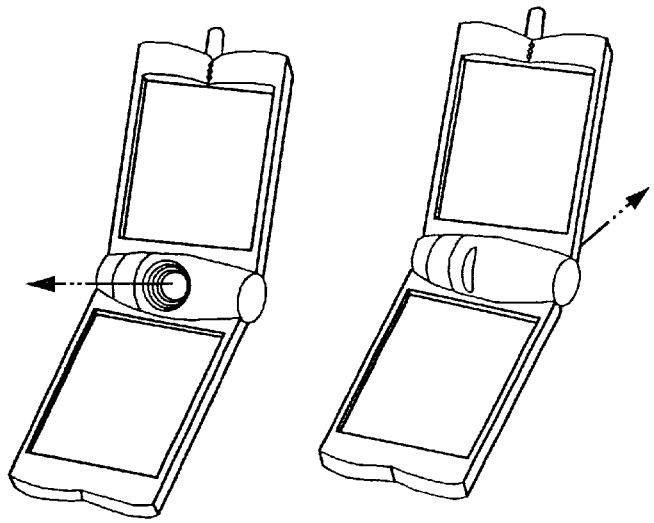

FIG. 5b shows a state of (2) in FIG. 4. The embodiment is suitable to be used as a telephone or a television telephone which will be described hereinlater ("transmission and reception" mode). It is also suitable to a case where the device is held by a hand and is used as a camera. FIG. 5b shows two examples of cases where the photographing directions of the video camera are opposite. It is needless to say that the photographing directions except for the example can be also used in this case.

Figure 5C:
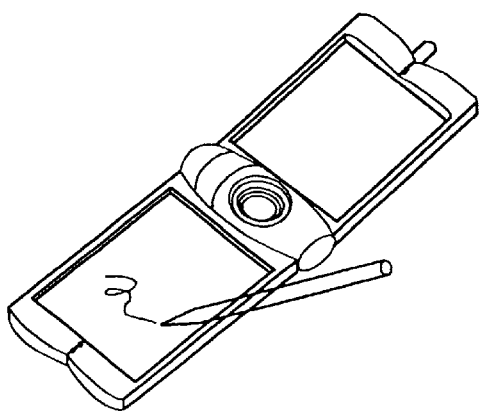

FIG. 5c shows the state of (3) in FIG. 4 and is adapted to a case where a text input and a handwriting input are executed on a table. Such inputs are executed by the display/operation part 5 of the lower case 2 as will be described hereinlater. Although the direction of the camera is just above in this case, it is needless to say that other photographing directions except for the foregoing direction are also possible.

Figure 5D:
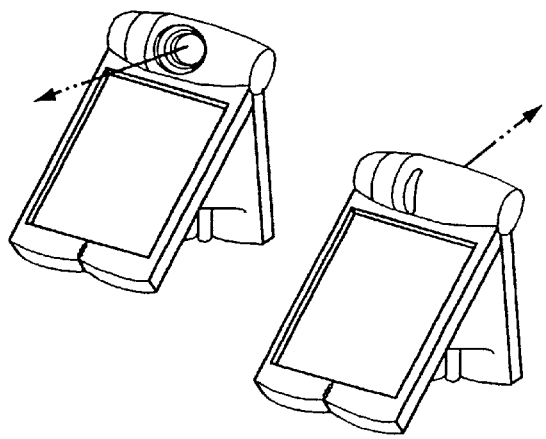

FIG. 5d shows the state of (4) in FIG. 4, in which the cases 1 and 2 are stood as legs and which is suitable to a case where the device is used as a television telephone, a camera, or the like on a table ("transmission/reception" mode and "recording" mode). In this case as well, two examples in which the photographing directions of the video camera are opposite to each other are shown. In this case as well, it is needless to say that other photographing directions except for the above example can be also used.

The opening angles are shown as just an example. The invention is not limited by the opening angles. For example, in case of using as shown in FIG. 5(d), the opening angle can be set, for example, in a range of ±15° of 270°.

An example of using the embodiment will now be described.

Figure 6:
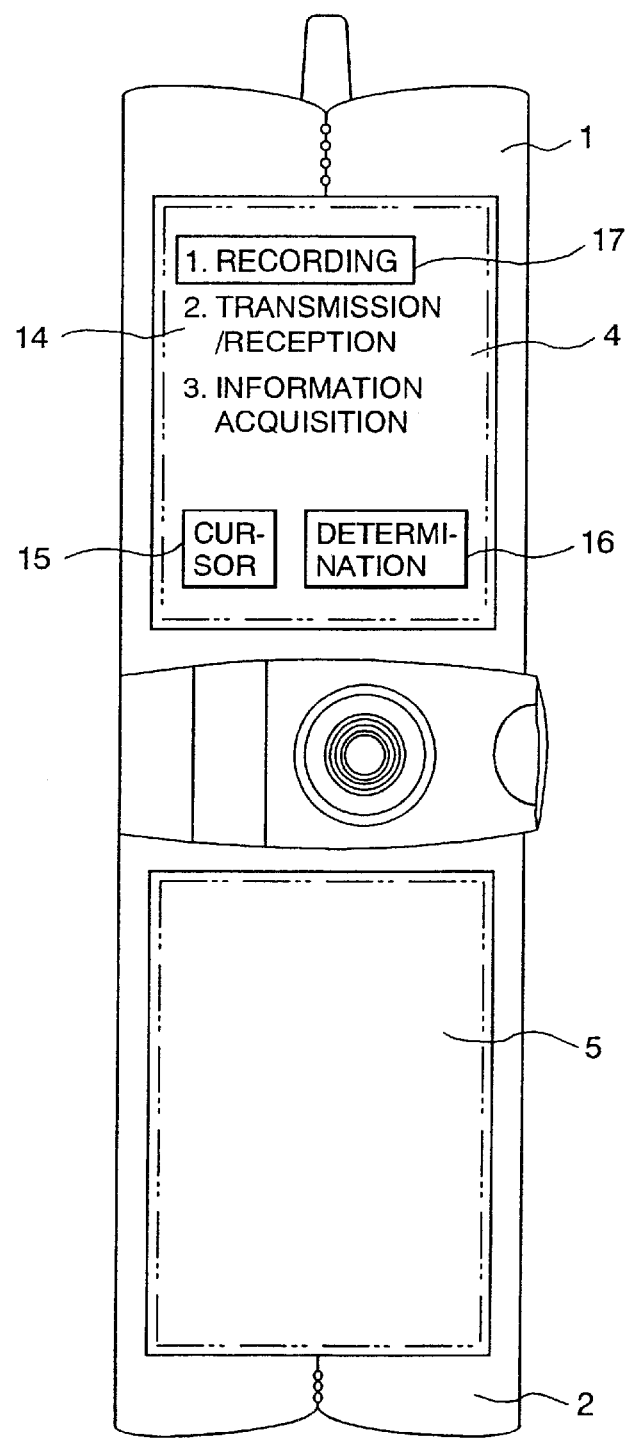
FIG. 6 is an explanatory diagram showing a use mode selecting operation in the embodiment shown in FIG. 1.

As shown in FIG. 6, when the power source button 11 (FIG. 1) is operated and the power source is turned on in a state where the cases 1 and 2 are open, a menu image including at least a menu 14 showing use modes, a cursor button 15, and a determination button 16 is displayed in the display/operation part 4 of the upper case 1. It is assumed that three kinds of use modes of "recording" mode, "transmission/reception" mode, and "information acquisition" mode can be selected here. The cursor button 15 is a display button of a touch type. Each time the cursor button 15 is touched, a cursor 17 in a frame shape-is moved, thereby repeatedly changing the use mode in accordance with the order of "recording" mode, "transmission/reception" mode, and "information acquisition" mode. When a desired use mode is designated by adjusting the cursor 17 and the determination button 16 as a touch type display button is similarly touched, it is determined that the designated use mode is selected. On the basis of the determination, the use mode enters a set state and an image according to the set use mode is displayed on the display/operation parts 4 and 5.

Figure 7:
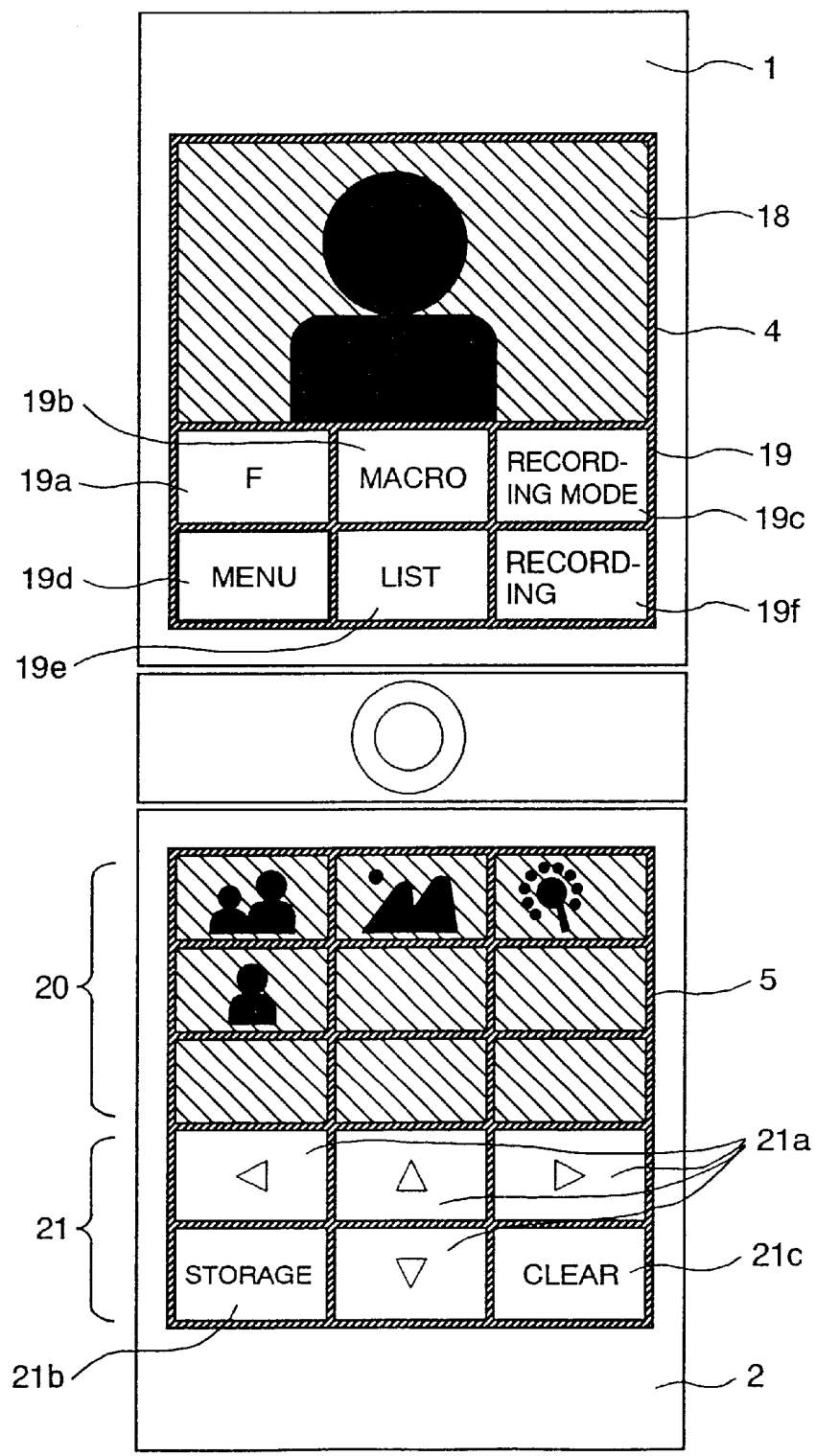
FIG. 7 is a diagram showing the display contents in display/operation parts in a "recording" mode as one of the use modes in the embodiment shown in FIG. 1.

By touching the cursor button 15 to make the cursor 17 adjusted to the "recording" mode and touching the determination button 16 to select the "recording" mode, a display state shown in FIG. 7 is obtained.

That is, as shown in the diagram, a display part 18 and an operation part 19 are displayed in the display/operation part 4 of the upper case 1 and an image (camera image) photographed by the video camera housed by the housing member 8 (FIG. 1) is displayed in the display part 18. In the operation part 19, touch buttons of an F button (function key) 19a, a macro button 19b for setting a macro photographing mode, a recording mode button 19c for selecting a recording mode (moving picture recording mode, still picture recording mode, and voice recording mode), a menu button 19d, a list button 19e for displaying a list of record contents, and a recording button 19f for indicating recording/recording stop are displayed.

When the "recording" mode is set from the state shown in FIG. 6, in the initial state of the mode, the video camera is in a regular photographing mode and a camera image is displayed in the display part 18. When the macro photographing is desired, it is sufficient to touch the macro button 19b. When the mode is desired to be changed from the macro photographing mode to the regular photographing mode, it is sufficient to operate again the macro button 19b.

In the initial state, when the "recording" mode is, for example, in the moving picture recording mode. In this case, by touching the recording button 19f, for example, a moving image signal is recorded in a recording medium built in the upper case 1. When it is desired to change the "recording" mode, it is sufficient to touch the recording mode button 19c. Each time the recording mode button 19c is touched, the mode is sequentially and repeatedly switched, for example, in accordance with the order of the moving picture recording mode, the still picture recording mode, and the voice recording mode. Information indicative of the "recording" mode and the photographing mode which are presently set is displayed, for example, in a predetermined position of the display part 18. When the moving picture recording mode and the voice recording mode are set, the recording is started by touching the recording button 19f and the recording is finished by touching the recording button 19f again. When the still picture recording mode is set, the recording button 19f functions as a shutter button. A still image of one picture plane (image signals of one field or one frame) is recorded each time the recording button 19f is touched.

When the "recording" mode is desired to be canceled, it is sufficient to touch the menu button 19d. The state is thereby returned to the state shown in FIG. 6.

When the list button 19e is touched, as shown in the diagram, a display part 20 and an operation part 21 are displayed in the display/operation part 5 of the lower case 2. In the display part 20, images which have been recorded so far are displayed in a list table. With respect to a moving image, for example, an image of the head one field or one frame is reduced and displayed. With respect to a still image, the still image itself is reduced and displayed.

In the operation part 21, cursor/scroll buttons 21a, a storing button 21b, and a clear button 21c are displayed. The cursor/scroll buttons 21a are used to designate a desired image in the list table of the display part 20. When there is an image which is desired to be eliminated from the list table, it is indicated by the cursor/scroll buttons 21a and the clear button 21c is touched, thereby erasing the image from the built-in recording medium and eliminating it from the list table. In this manner, a state in which only desired images are displayed in the list table of the display part 20 is obtained. When the storing button 21b is touched in such a state, the image of the display/operation part 5 is disappeared. In this instance, only a desired image or voice is recorded in the built-in medium. The cursor/scroll buttons 21a also have the function of scrolling. When the cursor is positioned to an upper or lower side part or a right or left side part of the display part 20 and is further touched, the image is scrolled to the upper or lower direction or the right or left direction.

By touching the F button 19a, the functions of the buttons of the operation part 21 in the display/operation part 5 can be changed.

As mentioned above, in the "recording" mode, a desired object can be photographed and a photographed image can be recorded as a moving picture or a still picture. Moreover, even after the recording, the recorded images can be selected and only desired images can be stored.

Although audio data is not shown, it is assumed that recorded images and audio data are displayed in accordance with the recording order in the list table displayed in the display part 20. For example, "audio data" is displayed in the column of audio data. When the "audio data" is indicated by touching the cursor/scroll buttons 21a, the audio data can be reproduced from the microphone 13 (FIG. 1). By touching the clear button 21c at this time, the audio data can be erased.

Figure 8A:
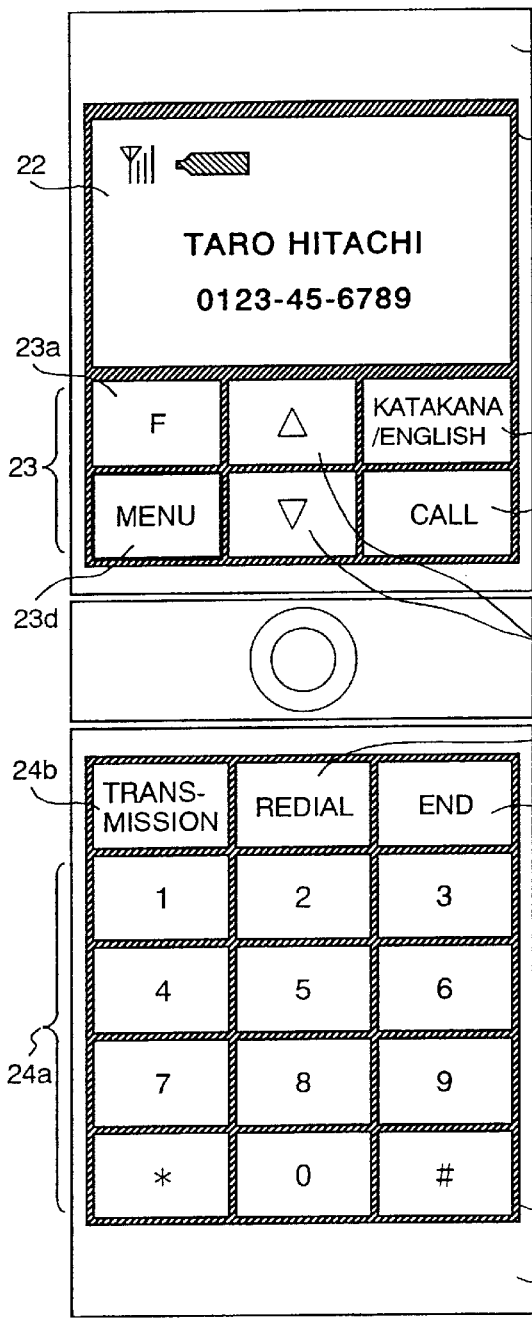
FIGS. 8a and 8b are a diagram showing the display contents in the display/operation parts in a transmission/reception mode as another one of the use modes in the embodiment shown in FIG. 1.

When the "transmission/reception" mode is designated by the cursor button 15 in the state shown in FIG. 6 and the determination button 16 is touched, the "transmission/reception" mode in the display state shown in FIG. 8(a) is set. In this mode, the device is basically used as a telephone.

That is, a display part 22 and an operation part 23 are displayed in the display/operation part 4 of the upper case I and nothing is displayed in the display part 22 in the initial state. In the operation part 23, touch buttons of an F button 23a used for registering a telephone number of the other side or the like, scroll buttons 23b for scrolling information (registered other side's telephone number or the like) displayed in the display part 22, a katakana/English button 23c for switching katakana/English inputting modes, a menu button 23d, and a call button 23e are displayed.

In the display/operation part 5 of the lower case 2, a ten-key 24*a*, a transmission button 24*d*, a redial button 24*c*, and an end button 24*d* are displayed. By touching the F button 23*a*, the functions of the input button 23*a* and the menu button 23*d* can be changed by the ten-key 23*a* and the input can be changed to katakana characters or English characters by the katakana/English button 23*c*. By touching the F button 23*b*, the katakana/English button 23*c*, and the ten-key 24*a*, the name and the telephone number of the other side can be registered. When the registered information is read out and a telephone call is made to the other side, by touching the F button 23*a* and the menu button 23*d*, the registered name and the telephone number of the other side are displayed in the display part 22. The names and the telephone numbers of the other side to be displayed are scrolled each time the scroll button 23*d* is touched. By touching the transmission button 24*b* when the name and the telephone number of the other side to whom a telephone call is desired to be made are displayed, the transmission is started and the other side is called.

After that, the line is connected to the other side and conversation can be held. In the case where the other side is a telephone, when the device functions as a telephone and the conversation is desired to be finished in display state shown in FIG. 8(*a*), it is sufficient to touch the end button 24*d*. The conversation is consequently finished. By touching the menu button 23*d*, the state is returned to the state shown in FIG. 6.

When the other side connected as mentioned above is a television telephone, the device detects the fact by information from the other side and the state is changed to a state shown in FIG. 8(*b*).

That is, in the display/operation part 4 of the upper case 1, a display part 25*a* in which a self image obtained by the built-in video camera is displayed, a display part 25*b* in which an image of the other side sent from the other side is displayed, the menu button 23*d*, the F button 23*a*, and an other side/self button 25*c* are displayed. The other side/self button 25*c* is used to switch a mode for displaying the self image and the other side image in respective two regions of the display parts 25*a* and 25*b* as shown in the diagram, a mode for displaying only the self image, and a mode for displaying only the other side image each time the button 25*c* is touched. The modes are sequentially switched every touching operation.

In the display/operation part 5 of the lower case 2, as shown in the diagram, in addition to the transmission button 24*b*, the redial button 24*c*, and the end button 24*d*, an attachment button 26*a*, a handwriting memo button 26*b*, and the like are displayed. In the embodiment, a memory in which various data is stored is also built in. By touching the attachment button 26*a*, the data is read out and a child picture plane is displayed (sum nail display) in a proper place in the display/operation part 5. By touching cursor/scroll buttons 26*c*, the data displayed in the child picture plane can be scrolled. By adjusting the cursor on desired data and touching the transmission button 24*b*, the data can be transmitted to the other side.

The data can be properly inputted by touching the F button 23*a* and the ten-key 24*a* in the state shown in FIG. 8*a*.

Figure 8B:
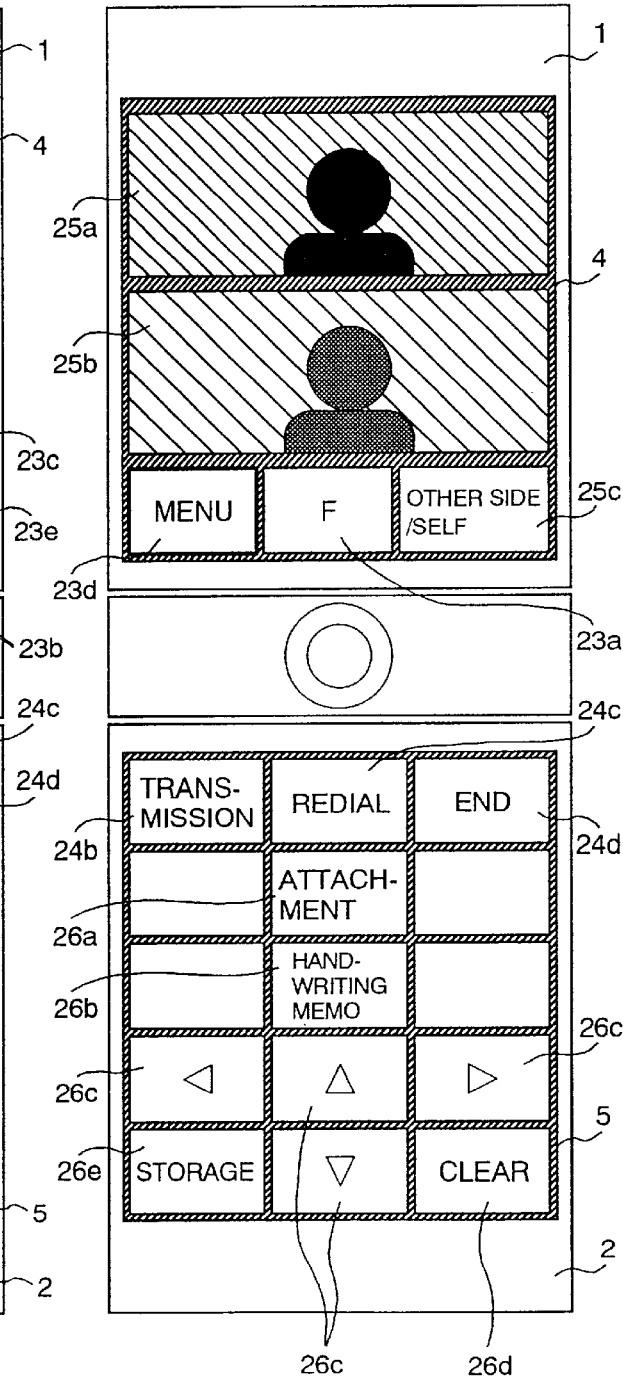

In FIG. 8*b*, by touching the handwriting memo button 26*b*, a part of the display/operation part 5 becomes a picture plane of a memo and notes can be taken in the part. In this case as well, by touching the transmission button 24*a*, the memo can be transmitted to the other side. When the memo is not transmitted, it can be erased by touching the clear button 26*d*. Alternatively, the memo can be stored into the memory by touching the storing button 26*e*.

When a call is made by the other side, even if the power source is turned off and the device is in another mode such as the "recording" mode, a ringing tone is sounded. In this case, when the power source is turned off, by turning on the power source as mentioned above, the function as a telephone, that is, the transmission/reception mode is set immediately. It is also possible that by turning on the power source, the device enters the state shown in FIG. 6. By selectively setting the transmission/reception mode, the transmission/reception mode is set.

When the ringing tone is sounded in any mode except for the transmission/reception mode, by touching the menu button (for example, the menu button 19*a* in FIG. 7 when the device is in the "recording mode"), the mode can be switched to the transmission/reception mode immediately. In this case as well, the state shown in FIG. 6 is set by touching the menu button and the transmission/reception mode may be set by selecting and setting the transmission/reception mode.

When the transmission/reception mode is set as mentioned above, in the case where the other side is a telephone, the state shown in FIG. 8(*a*) is set and conversation can be held. In the case where the other side is a television telephone, the state shown in FIG. 8(*b*) is set and conversation can be held.

When data or handwritten memo from the other side is received, it is displayed in a part of the display/operation part 5.

Although the image shown in FIG. 8(*b*) is immediately displayed in case of the television telephone in the above description, in a manner similar to the case of the telephone shown in FIG. 8(*a*), the ten-key 24*a* is displayed in the display/operation part 5 of the lower case 2 and the display state shown in FIG. 8(*b*) may be set by touching the F button 23*a*.

According to the embodiment as mentioned above, whether the other side is a telephone or a television telephone, the conversation can be held according to the telephone or the television telephone and data or handwritten memo can be transmitted and received to/from the other side.

When the "information acquisition" mode is designated by the cursor button 15 and the determination button 16 is touched in the state shown in FIG. 6, the "information acquisition" mode of the display state shown in FIG. 9 is set. In the mode, various information service can be received from the outside.

In FIG. 9, in the "information acquisition" mode, a menu button 27*b*, an F button 27*c*, and an access destination list button 27*d* are displayed in the lower part of the display/operation part 4 of the upper case 1. When the access destination list button 27*d* is touched, the kinds of information service are displayed in a display part 28*a* in the display/operation part 5 of the lower case 2. When cursor/scroll buttons 28*b* displayed in the lower part of the display/operation part 5 are touched and information service is designated by the cursor, the contents of the information service are received and displayed in a display part 27*a* of the display/operation part 4 of the upper case 1. The information service to be received is sequentially changed each time the cursor/scroll button 28*b* is touched. When the cursor/scroll button 28*d* is continuously touched in a state where the information service in the end part is designated by the cursor, the contents displayed in the display part 28*a* are scrolled and the other part of the information service list is sequentially displayed.

When a storing button 28c is touched, the contents of the information service displayed in the display part 27a in this instance are stored into the built-in memory. In order to read out the stored contents of the information, for example, the function of the storing button 28c is changed to a read button by touching the F button 27c and the read button is touched, thereby enabling the reading operation to be performed. In this case, the list of the stored information contents is displayed in the display part 28a. By touching the cursor/scroll button 28b, a desired information content can be selected. The selected information content is displayed in the display part 27a. When the information content displayed is unnecessary in this instance, by touching a clear button 28d, it can be erased. When the storing button 28c is touched in the state where the information contents is read out from the memory and are displayed as mentioned above, the device is returned to the original state of receiving information service. Further, when the menu button 27b is touched, the device is returned to the state of FIG. 6.

In the above manner, according to the embodiment, the necessary information service can be received from the outside, stored, and read out later.

The contents of the information service can be also made as the data in the television telephone described with reference to FIG. 8(b). By touching the attachment button 26a, the contents of the information service can be transmitted to the other side.

Although one embodiment of the invention has been described above, the invention is not limited by the embodiment.

For example, the initial image displayed in the display/operation part when the power source is turned on by operating the power source button 11 (FIG. 1) is set to the menu image shown in FIG. 6 in the foregoing description. Alternatively, the transmission/reception mode may be set as an initial use mode by turning on the power source, the image shown in FIG. 8(a) is displayed, and the function as a telephone can be provided. In this case, when the menu button 23d is touched, a state in which the menu image shown in FIG. 6 is displayed is set and another use mode can be therefore set.

In the state shown in FIG. 6, by displaying and touching the cursor button 15, the cursor is moved and a desired use mode can be selected. A desired use mode can be selected also by touching a display part of the desired use mode among the use modes displayed. In this case, it is unnecessary to provide the cursor button 15. In this case as well, the use mode is not set only by selecting it. In order to set the use mode, further, the determination button 16 is touched.

As mentioned above, according to the invention, since the camera is built in the connection part to which the upper and lower cases are rotatably attached, no member is arranged on the facing surfaces of the upper and lower cases. A display picture plane can be therefore formed almost on the whole surface of each of the upper and lower cases. While the device is small and is suitable for carrying, an image can be displayed larger and easier to be watched. A number of operation buttons of the touch operation type can be set and multifunction can be realized.

Additionally, as the video camera is accommodated in the housing member to which the upper and lower cases are attached rotatably each other, the video camera is usable even if the cases are opened.

According to the invention, the small, very convenient information communication terminal device which has different functions such as recording mode, transmission/reception mode, and information acquisition mode can be provided.

What is claimed is:

1. An information communication terminal device, comprising:
    a first display/operation part and a second display/operation part mounted on an upper case and a lower case, respectively;
    a housing member accommodating a video camera therein;
    a support mechanism supporting rotatably said first display/operation part, said second display/operation part and said housing member on the same rotation axis,
    said first and second display/operation parts being mounted rotatably at least 180 degrees about said housing member and being structured so as to be opposed to one another when the information communication terminal device is in an opened condition and to be overlapped with one another when the information communication terminal device is in a closed condition.

2. An information communication terminal device according to claim 1, wherein angles between said first and second display/operation parts are changeable and lockable at a plurality of stages.

3. An information communication terminal device according to claim 1, wherein a respective rotatable support member is attached at an inner end portion of said first and second display/operation parts and is combined with an end portion of said housing member so that three rotatable support members are provided and are capable of rotation with respect to each other on the same rotation axis.

4. An information communication terminal device according to claim 1, wherein said housing member accommodating the video camera is rotatable by at least 180 degrees.

5. An information communication terminal device according to claim 1, wherein each of said first and second display/operation parts have a display part for displaying an image at an upper portion thereof and an operation part having a touch panel at a lower portion thereof.

6. An information communication terminal device comprising:
    an upper case and a lower case;
    a housing member accommodating a camera;
    a connecting part including a hinge connecting the upper case, the lower case and the housing member;
    wherein the hinge and housing member are rotatably supported on the same rotation axis, the hinge being arranged at one side of the connecting part, and the housing member being arranged at the other side of the connecting part.

7. An information communication terminal device according to claim 6, wherein the housing member accommodating the camera is rotatably supported to the hinge.

8. An information communication terminal device according to claim 6, wherein the housing member has a through hole optically connecting the camera and an external side, and at least one lens of the camera is covered by the upper case and lower case when the upper and lower cases are in a closed position.

9. An information communication terminal device according to claim 6, wherein a photographing direction of the camera is changeable by turning the housing member.

10. An information communication terminal device comprising:

an upper case and a lower case rotatably connected to each other, one of the upper and lower cases having a rotary shaft and the other of the upper and lower cases having a rotary shaft supporting part coupled to the rotary shaft to form a hinge; and a housing member accommodating a camera rotatably attached to the rotary shaft supporting part from an opposite side of the rotary shaft coupling to the rotary shaft supporting part;

wherein the upper and lower cases and the housing member are rotatably supported on the same rotation axis.

* * * * *